US009474026B2

United States Patent
Hennelly et al.

(10) Patent No.: US 9,474,026 B2
(45) Date of Patent: Oct. 18, 2016

(54) COMMUNICATIONS DEVICE AND A METHOD THEREBY, A BASE STATION AND A METHOD THEREBY, A SYSTEM, AND A NON-TRANSITORY COMPUTER READABLE MEDIUM

(71) Applicant: NEC Corporation, Tokyo (JP)

(72) Inventors: Martin Hennelly, Berkshire (GB); Iskren Ianev, Berkshire (GB); Hayato Haneji, Berkshire (GB); Yannick Lair, Berkshire (GB)

(73) Assignee: NEC CORPORATION, Tokyo (JP)

( * ) Notice: Subject to any disclaimer, the term of this patent is extended or adjusted under 35 U.S.C. 154(b) by 28 days.

(21) Appl. No.: 14/430,379

(22) PCT Filed: Jul. 29, 2013

(86) PCT No.: PCT/JP2013/071088
§ 371 (c)(1),
(2) Date: Mar. 23, 2015

(87) PCT Pub. No.: WO2014/045736
PCT Pub. Date: Mar. 27, 2014

(65) Prior Publication Data
US 2015/0327178 A1 Nov. 12, 2015

(30) Foreign Application Priority Data
Sep. 21, 2012 (GB) .................................. 1216927.2

(51) Int. Cl.
*H04W 4/00* (2009.01)
*H04W 52/02* (2009.01)
(Continued)

(52) U.S. Cl.
CPC ......... *H04W 52/0245* (2013.01); *H04W 4/005* (2013.01); *H04W 28/0236* (2013.01); *H04W 72/085* (2013.01); *H04W 72/1231* (2013.01)

(58) Field of Classification Search
CPC .......... H04W 52/02; H04W 52/0216; H04W 52/0245; H04W 84/12; H04W 4/005; H04W 72/085; H04W 72/1231; H04W 28/0236; Y02B 60/50
USPC ......................................................... 370/311
See application file for complete search history.

(56) References Cited

U.S. PATENT DOCUMENTS

| 7,672,660 B2 * | 3/2010 | Kim ...................... H04W 36/24 455/343.1 |
| 2009/0085915 A1 * | 4/2009 | Kelley .................... G06T 17/05 345/427 |

(Continued)

FOREIGN PATENT DOCUMENTS

| DE | 10 2004 021 146 | 11/2005 |
| EP | 1 014 739 | 6/2000 |

(Continued)

OTHER PUBLICATIONS

International Search Report, PCT/JP2013/071088, Oct. 8, 2013.
(Continued)

*Primary Examiner* — Afsar M Qureshi
(74) *Attorney, Agent, or Firm* — Young & Thompson

(57) ABSTRACT

A system is disclosed in which a communications device communicates via a cell operated by a base station of a communications network. The communications device identifies that transmission of data to a communications node coupled to the communications network has been triggered; determines whether an indication of radio quality in the cell meets a required radio quality criteria responsive to the transmission being triggered. The transmitting element transmits the data to the communications network after a delay if the quality of radio signals does not meet the required radio quality criteria, and without the delay if the quality of radio signals meets the required radio quality criteria.

20 Claims, 7 Drawing Sheets

(51) Int. Cl.
*H04W 72/08* (2009.01)
*H04W 28/02* (2009.01)
*H04W 72/12* (2009.01)

(56) References Cited

U.S. PATENT DOCUMENTS

| | | | |
|---|---|---|---|
| 2009/0196275 A1* | 8/2009 | Damnjanovic | H04W 28/06 370/345 |
| 2012/0034923 A1* | 2/2012 | Nakai | H04W 76/027 455/438 |
| 2013/0064094 A1* | 3/2013 | Nakao | H04W 40/02 370/238 |
| 2013/0322393 A1* | 12/2013 | Kishiyama | H04L 5/0057 370/329 |
| 2014/0045487 A1* | 2/2014 | Mustapha | H04W 36/18 455/422.1 |
| 2015/0172175 A1* | 6/2015 | Sasaki | H04L 49/00 370/392 |

FOREIGN PATENT DOCUMENTS

| | | |
|---|---|---|
| GB | 2484498 | 4/2012 |
| WO | WO2009/100150 | 8/2009 |
| WO | WO2010/067672 | 6/2010 |
| WO | WO2010/086734 | 8/2010 |

OTHER PUBLICATIONS

GB Search Report, 1216927.2, Jan. 14, 2013.

3GPP TS 22.368 V11.5.0 (Jun. 2012) 3rd Generation Partnership Project; Technical Specification Group Services and System Aspects; Service requirements for Machine-Type Communications (MTC); Stage 1 (Release 11).

3GPP TS 24.368 V11.1.0 (Jun. 2012) 3rd Generation Partnership Project; Technical Specification Group Core Network and Terminals; Non-Access Stratum (NAS) configuration Management Object (MO) (Release 11).

3GPP TS 31.102 V11.2.0 (Jun. 2012) 3rd Generation Partnership Project; Technical Specification Group Core Network and Terminals; Characteristics of the Universal Subscriber Identity Module (USIM) application (Release 11).

* cited by examiner

COMMUNICATIONS DEVICE AND A METHOD THEREBY, A BASE STATION AND A METHOD THEREBY, A SYSTEM, AND A NON-TRANSITORY COMPUTER READABLE MEDIUM

TECHNICAL FIELD

The present invention relates to a communications system. The invention has particular but not exclusive relevance to wireless communications systems and devices thereof operating according to the 3rd Generation Partnership Project (3GPP) standards or equivalents or derivatives thereof. The invention has particular although not exclusive relevance to the scheduling of transmissions by Machine-Type Communications devices.

BACKGROUND ART

The latest developments of the 3GPP standards are referred to as the Long Term Evolution (LTE) of EPC (Evolved Packet Core) network and E-UTRAN (Evolved UMTS Terrestrial Radio Access Network). Under the 3GPP standards, a NodeB (or an eNB in LTE) is the base station via which communications devices connect to a core network and communicate to other communications devices or remote servers. For simplicity, the present application will use the term base station to refer to any such base stations. Communications devices might be, for example, mobile communications devices such as mobile telephones, smartphones, user equipment, personal digital assistants, laptop computers, web browsers, e-book readers and the like. Such mobile (or even generally stationary) devices are typically operated by a user. However, 3GPP standards also make it possible to connect Machine-Type Communications (MTC) devices (sometimes also referred to as Machine-to-Machine (M2M) communications devices) to the network, which typically comprise automated equipment, such as various measuring equipment, telemetry equipment, monitoring systems, tracking and tracing devices, in-vehicle safety systems, vehicle maintenance systems, road sensors, digital billboards, point of sale (POS) terminals, remote control systems and the like. MTC devices can be implemented as a part of a (generally) stationary apparatus such as vending machines, roadside sensors, POS terminals, although some MTC devices can be embedded in non, stationary apparatus (e.g. vehicles) or attached to animals or persons to be monitored/tracked.

For simplicity, the present application refers to MTC devices in the description but it will be appreciated that the technology described can be implemented on any communications devices (mobile and/or generally stationary) that can connect to a communications network for sending/receiving data, regardless whether such communications devices are controlled by human input or software instructions stored in memory.

MTC devices connect to the network to send to or receive data from a remote 'machine' (e.g. a server) or user. MTC devices use communication protocols and standards that are optimised for mobile telephones or similar user equipment. However, MTC devices, once deployed, typically operate without requiring human supervision or interaction, and follow software instructions stored in an internal memory. MTC devices might also remain stationary and/or inactive for a long period of time. The specific network requirements to support MTC devices have been dealt with in the 3GPP TS 22.368 standard, the contents of which are incorporated herein by reference.

Some MTC devices are deployed at remote, hazardous, or concealed locations or at locations with restricted access. In addition, they might be deployed in a high number and over a large geographical area (e.g. tsunami detection sensors). MTC devices are thus generally designed to be able to operate without human supervision and for as long as possible. For example, MTC devices can be programmed to autonomously set up a connection to report an event and then to go back to a low-power mode of operation, such as a sleep mode, stand-by mode, and the like.

Power consumption is a highly important aspect of all mobile terminals relying on battery power and also mobile terminals using an external power supply. Its importance increases with the continued growth of MTC device population and their more demanding use cases. In the case of certain Machine to Machine (M2M) applications, e.g. sensors that are running on battery power, the on-site exchange (or recharging) of the batteries of a large number of devices can represent a significant expense for MTC device owners/operators. Furthermore, the battery lifetime can determine the device's lifetime or useful operational time if it is not possible to charge or replace the battery cost effectively.

In a battery powered communications device, battery life reduces with increased transmission power. In 3GPP networks, power control is used in order to reduce transmission power and overall interference. For example, a mobile terminal that is located close to its serving base station (and/or experiencing generally good signal propagation characteristics) transmits using a relatively low power, whilst a mobile terminal that is located further away from the base station (and/or under bad propagation characteristics) transmits using relatively higher power, e.g. near to or at a maximum transmit power. This mechanism can be used to improve battery life for mobile terminals that are located near their serving base station most of the time (typically, for example, in an urban environment with good network coverage) because they rarely have to transmit using their maximum transmission power. However, a principal goal of the above 3GPP power control scheme is not to conserve battery power but to balance the signal quality of each physical link at the base station's transceiver, thereby maximising the overall system capacity.

SUMMARY OF INVENTION

Technical Problem

In order to achieve further improvements in battery conservation, therefore, there is a need for an improved power control mechanism that may be sufficient to further prolong the battery life of communications devices (e.g. MTC devices) that are experiencing varying signal conditions e.g. due to their mobility or significant changes in the attenuation of the signal path between them and their serving base station.

Accordingly, preferred embodiments of the present invention aim to provide methods and apparatus which address or at least partially deal with the above needs.

Solution to Problem

Although for efficiency of understanding for those of skill in the art, the invention will be described in detail in the context of a 3GPP system (UMTS, LTE), the principles of the invention can be applied to other systems in which communications devices or User Equipment (UE) access a core network using a radio access technology.

Accordingly, in one aspect the invention provides a communications device for communicating via a cell operated by a base station of a communications network, the communications device comprising: means for identifying that transmission of data to a communications node coupled to said communications network has been triggered; means for determining an indication of radio quality in said cell and for determining whether said indication of radio quality meets a required radio quality criteria responsive to said transmission being triggered; and means for transmitting said data to the communications network, wherein said transmitting means is operable to: (a) transmit said data to said communications network after a delay if said determining means has determined that said quality of radio signals does not meet said required radio quality criteria; and (b) transmit said data to said communications network without said delay if said determining means has determined that said quality of radio signals meets said required radio quality criteria.

The communications device might further comprise means for monitoring, when said determining means has determined that said quality of radio signals does not meet said required criteria, said indication of radio quality in said cell and for determining whether said indication of radio quality changes to meet said required radio quality criteria.

The means for transmitting said data might be operable to transmit said data to the communications network after a predetermined maximum delay if said monitoring means determines that said indication of radio quality has not changed to meet said required radio quality criteria. The means for transmitting said data might also be operable to transmit said data to the communications network, before said predetermined maximum delay has expired, responsive to said monitoring means determining that said indication of radio quality has changed to meet said required radio quality criteria.

The monitoring means might be operable to determine if a change in said indication of radio quality is indicative of a decrease in said radio quality and wherein said means for transmitting said data is operable to transmit said data to the communications network, before said predetermined maximum delay has expired, responsive to said monitoring means determining that a change in said indication of radio quality is indicative of a decrease in said radio quality.

The predetermined maximum delay might be set by an entity in the communications network, for example the base station. The predetermined maximum delay might be set dependent on an identity or type of at least one of: any data to be sent; an application generating the data; said communications device; said communications network; a base station; the cell in which the communications device is located; a routing area in which the communications device is located; a tracking area in which the communications device is located; and a location area in which the communications device is located; or a list comprising said identity or type.

The communications device might further comprise means for updating said predetermined maximum delay in the event of a change of cell serving said communications device to a cell having a different predetermined maximum delay.

The communications device might be configured to operate in a low-power mode, to enter a higher power mode in order to transmit any data, and to return to said low-power mode after any data has been transmitted.

The indicator of radio quality might comprise a signal quality measurement result. Furthermore, the radio quality criteria might comprise a threshold value. In this case, the indicator of radio quality might be determined to have met said radio quality criteria if said indicator of radio quality meets or exceeds said threshold value. Alternatively, the indicator of radio quality might be determined to have met said radio quality criteria if said indicator of radio quality meets or falls below said threshold value.

The radio quality criteria might be set by an entity in the communications network, for example said base station. The radio quality criteria might be provided as an offset relative to a default radio quality criteria.

The delay might be monitored using a timer.

The radio quality criteria might be set dependent on an identity or type of at least one of: any data to be sent; an application generating the data; said communications device; said communications network; a base station; the cell in which the communications device is located; a routing area in which the communications device is located; a tracking area in which the communications device is located; and a location area in which the communications device is located; or a list comprising said identity or type.

The communications device might further comprise means for configuring delayed transmission of data. In this case, the configuring means might be operable to configure the or a predetermined maximum delay and/or said radio quality criteria using at least one of: Non Access Stratum (NAS) signalling; Radio Resource Control (RRC) signalling; System Information broadcast; Open Mobile Alliance Device Management (OMA DM) signalling; Universal Subscriber Identity Module Over-the-Air (USIM OTA) signalling; and an Application Programming Interface (API) signalling.

The communications device might further comprise means for updating said radio quality criteria in the event of a change of at least one of: a location area (LA); a routing area (RA); a tracking area (TA); and a cell serving said communications device to an area and/or cell having a different radio quality criteria.

The communications device might further comprise means for identifying whether said data should be sent without delay, wherein said means for transmitting said data might be operable to transmit any data without delay that has been so identified regardless of whether said determining means has determined that said quality of radio signals does not meet said required radio quality criteria. In this case, the means for identifying whether said data should be sent without delay might be operable to identify at least one of: low-latency data; high priority data; and/or emergency data, as data that should be sent without delay.

The communications device might further comprise means for identifying whether said data may be sent with delay, wherein said means for transmitting said data might be operable to transmit any data without delay that has been so identified only if said determining means has determined that said quality of radio signals meets said required radio quality criteria. In this case, the means for identifying whether said data may be sent with delay might be operable to identify at least one of: high-latency data; low priority data; and/or synchronisation data, as data that may be sent with delay.

The communications might be at least one of a machine-type communications (MTC) device, a machine-to-machine (M2M) communications device, and a mobile telephone.

In another aspect, the invention also provides a base station of a communications network, the base station comprising: means for operating a cell for communication with a communications device according to any preceding aspect; means for providing, to said communications device, information identifying a (or the) predetermined maximum delay and/or said radio quality criteria; and means for receiving, from said communications device, said data when transmitted by said communications device.

The invention also provides corresponding methods and a system comprising the above communications device and the above base station.

A further aspect of the present invention provides a computer program product comprising computer implementable instructions for causing a programmable computer device to become configured as a communications device or the base station as described above. The computer software products may be provided on a carrier signal or on a recording medium, such as a CD, DVD or the like.

Embodiments of the invention will now be described, by way of example, with reference to the accompanying drawings in which:

Advantageous Effects of Invention

According to each exemplary aspect of the present invention stated above, it is possible to provide a communications device and a method thereby, a base station and a method thereby, a system, and a computer program for reducing battery consumption.

DESCRIPTION OF EMBODIMENTS

<Overview>

Figure 1:
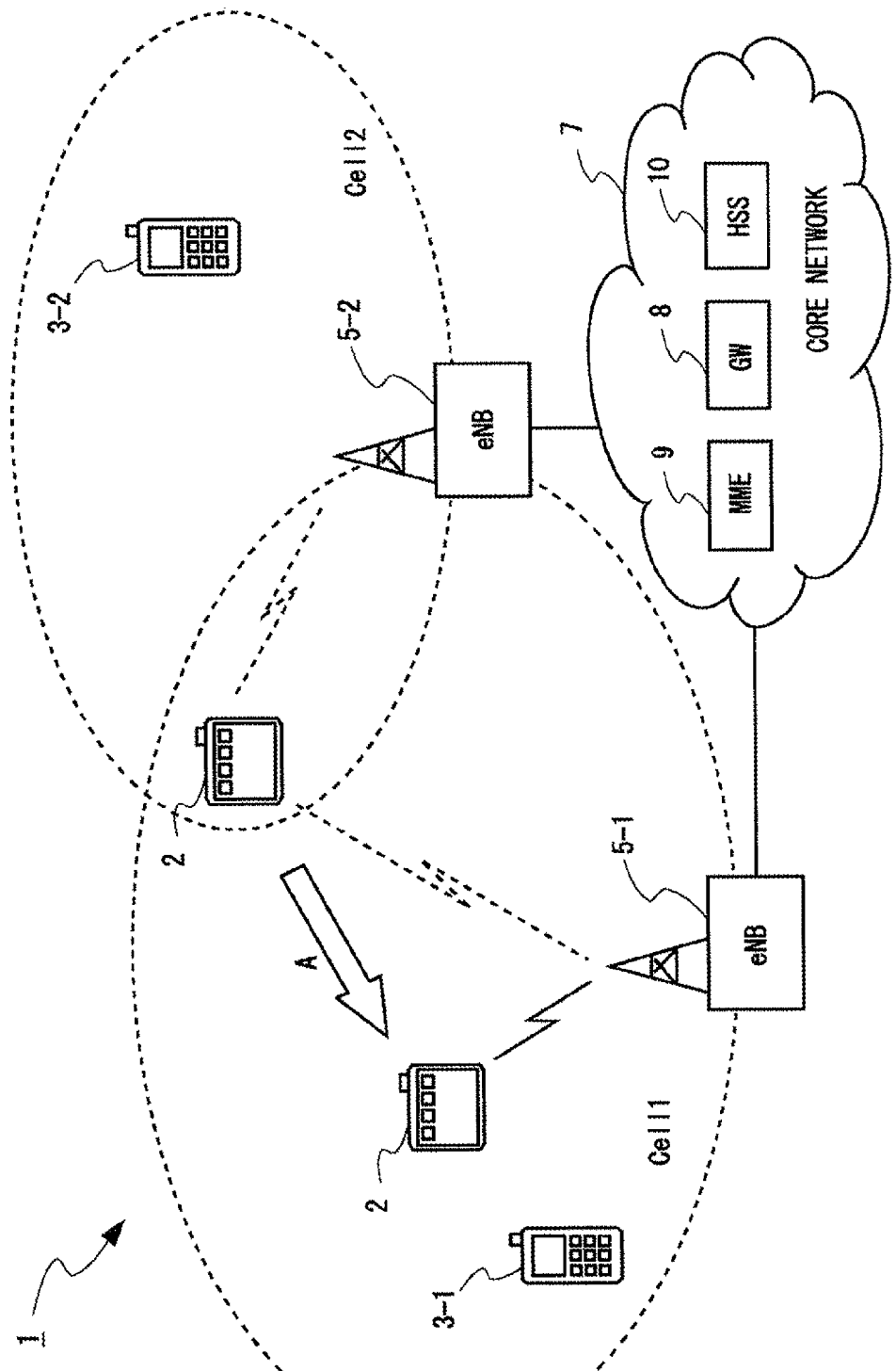
FIG. 1 illustrates schematically a cellular telecommunications system to which embodiments of the invention may be applied.

FIG. 1 schematically illustrates a telecommunications network 1 in which MTC devices 2, mobile telephones 3, and other communications devices (not shown) can communicate with each other via E-UTRAN base stations 5 and a core network 7 using an E-UTRA radio access technology (RAT). As those skilled in the art will appreciate, whilst one MTC device 2, two mobile telephones 3-1, 3-2, and two base stations 5-1, 5-2 are shown in FIG. 1 for illustration purposes, the system, when implemented, will typically include other base stations and communications devices.

The base stations 5 are connected to the core network 7 via an S1 interface and to each other via an X2 interface (not shown). The core network 7 includes a gateway 8 for connecting to other networks, such as the Internet and/or to servers hosted outside the core network 7.

A mobility management entity (MME) 9 is the network node responsible for keeping track of the locations of the mobile communication devices (e.g. mobile telephones 3 and the MTC device 2) within the communications network 1. In particular, the MME 9 stores an identifier of the mobile communication devices' last known cell (or tracking area) so that they can be notified when there is an incoming (voice or data) call for them and that a communication path is set up via the base station 5 currently serving the particular mobile communication device.

A home subscriber server (HSS) 10 stores subscription related information and control parameters specific for each communications device (e.g. the MTC device 2 and the mobile telephones 3). The HSS 10 also stores information identifying which ones of the communications devices are configured as machine-type communication devices (e.g. MTC device 2 or mobile telephone 3-1 when it is running an MTC client) and provides this information to the other network entities when needed.

In the following examples, the MTC device 2 connects to the network at specific intervals (and/or whenever one of its application needs to communicate with the network) for sending data to a remote server (or another communications device). The operation of the MTC device 2 of this embodiment is automated and capable of operating essentially autonomously. It will be appreciated, however, that the MTC device 2 may perform certain activities based on inputs received from a local or a remote user (e.g. remote (re) configuration of measurement criteria or out of schedule measurement performance and/or reporting). In addition, the MTC device 2 may be operated by a user in a similar manner as a mobile telephone 3.

Whilst the MTC device 2 may acquire data (e.g. results of measurements) in a continuous, periodic, or intermittent manner, however, the MTC device 2 communicates during specific communication rounds that occur at regular, or semi-regular, intervals, and sends any data acquired during a particular interval to the remote server in a batch during a subsequent communication round. The transceiver of the MTC device 2 is configured to automatically (or upon instructions by the base station 5) enter a low power mode (in which the transmitter may be switched off completely or operating at low power) during the intervals between consecutive communication rounds.

Further, in this embodiment, if the radio conditions in the vicinity of the MTC device 2 do not meet a predefined quality requirement, the MTC device 2 is beneficially able to delay transmission of data until the radio conditions improve sufficiently to meet the predefined quality requirement or until the a predetermined maximum allowed delay has been reached.

Specifically, when the MTC device 2 is due to transmit data, the MTC device 2 only performs the transmission immediately if the radio quality, as represented by a measured signal quality parameter, meets a predefined signal quality requirement. If the radio quality, as represented by the measured signal quality parameter, does not meet the predefined signal quality requirement then the MTC device 2 starts a transmission delay timer. If the MTC device 2 detects that the signal quality parameter has met the predefined signal quality requirement before the delay time has reached the maximum allowed delay then the MTC device 2 (i.e. before the delay timer expires) transmits the measurement data. Otherwise, the MTC device 2 starts transmitting when the delay time has reached the maximum allowed delay time. Whilst the delay timer is running the MTC device 2 beneficially continues to buffer any further data that it acquires for transmission when the delay timer expires or radio quality has improved sufficiently.

This approach beneficially allows the MTC device 2 improved flexibility to transmit data at a time at which a lower transmission power can be used because prevailing radio conditions have improved (e.g. as a result of the MTC device 2 moving closer to a base station 5 or other receiver, or as a result of a change in the local environmental conditions).

For example, in FIG. 1, when the MTC device 2 is located at its initial position the MTC device 2 (at the start of arrow 'A') it experiences a low radio quality and therefore does not transmit any data immediately but instead starts the transmission delay timer. If, before the delay time reaches its maximum allowed value, the MTC device 2 moves to a new position (as indicated by arrow 'A') in which radio quality is better (in this case because of a closer proximity to base station 5-1) then the MTC device 2 transmits any data. Otherwise data transmission does not start until the delay timer expires.

<Assessing Signal Quality>

One way in which signal quality can be assessed in this embodiment will now be described in more detail by way of example only.

By way of back ground, when a transmitter (e.g. the MTC device 2) transmits radio signals, the received power ($P_r$) at a receiver of the signals (e.g. base station 5-1) is a function of distance separation (d) between the transmitter and the receiver, and is calculated as:

$$P_r(d) = \frac{P_t G_t G_r \lambda^2}{(4\pi)^2 d^2 L}$$

where $P_t$ is the transmitter power, $G_t$ and $G_r$ are the transmitter and receiver antenna gains respectively, $\lambda$ is the wavelength, and L is the remaining system losses (excluding propagation). That is $$P_r(d) \propto \frac{1}{d^2 f^2}$$

That is that the transmit power required to provide a constant received power level at the receiver increases with the distance between the transmitter and receiver.

Apart from the relative distance between the transmitter and the receiver, attenuation of the signal might also be caused by other factors ('interferers'), such as obstruction, reflection, diffraction and scattering by the earth, vegetation, buildings, vehicles, etc. The received signal quality, $E_c/I_o$ (carrier energy/interference level) or $E_b/N_o$ (average energy of a bit signal/noise spectral density) is a function of system design topology and the number of active interferers in the system and will be limited to a maximum value by system design and capacity planning and implementation.

The MTC device 2, of this embodiment, is operable to measure a signal quality parameter that correlates strongly with the distance between the transmitter and the receiver and which varies with attenuation of the signal caused by other factors. In this embodiment which relates to an MTC device 2 operating in an E-UTRAN based system, the MTC device measures signal quality parameters comprising a Reference Signal Received Power (RSRP) and/or a Reference Signal Received Quality (RSRQ). The MTC device 2 compares at least one of these signal quality parameters with a respective signal quality threshold and if the respective threshold is exceeded, the requirement for transmitting the measurement data is deemed to have been met.

It will be appreciated that if the MTC device 2 were operating in another system a different signal quality parameter may be used (e.g. received signal code power (RSCP), $E_b/N_0$ or $E_c/I_o$ for UTRAN or receiver level (RXLEV) and receiver quality (RXQUAL) for GSM).

<MTC Device>

Figure 2:
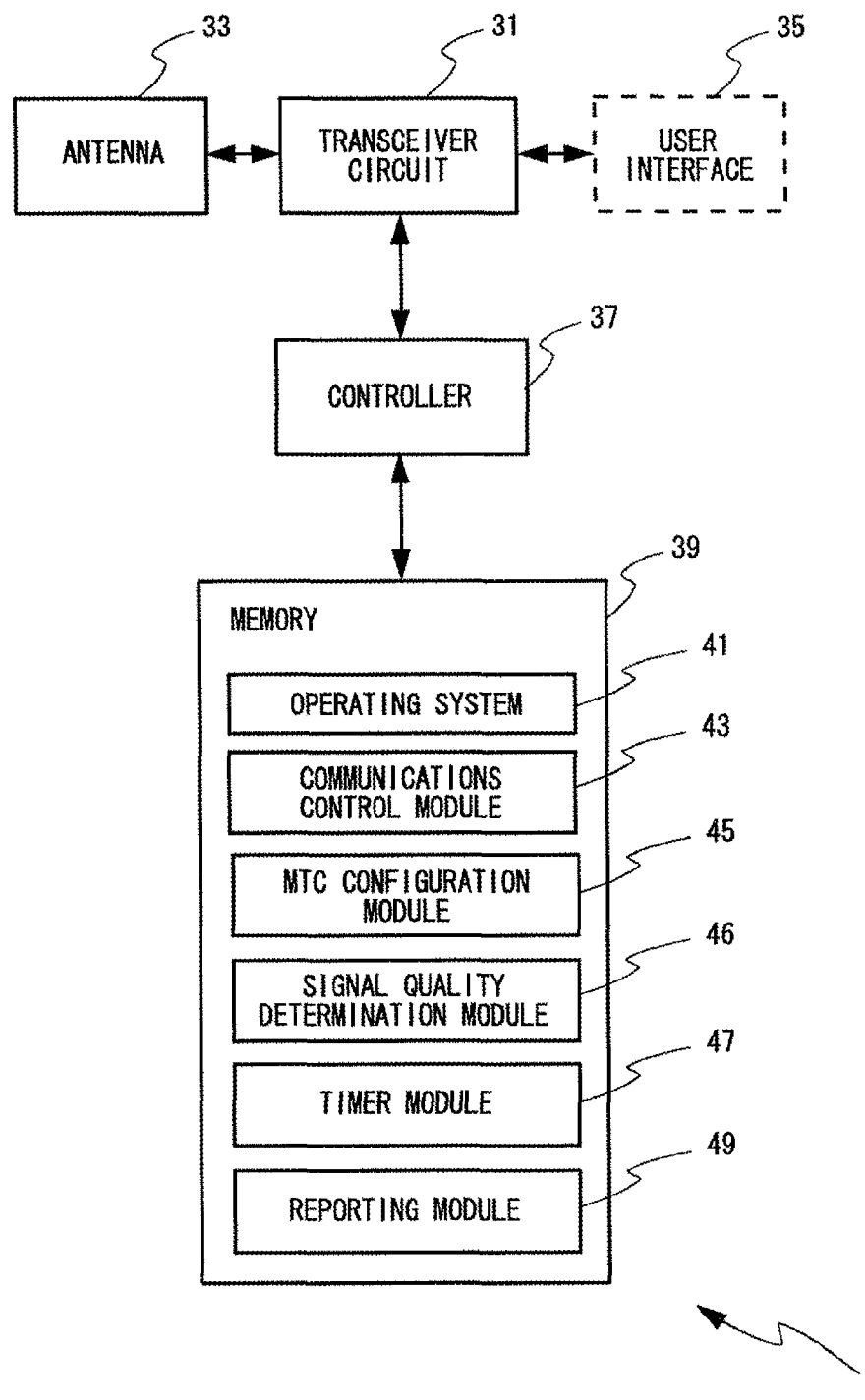
FIG. 2 is a block diagram of a MTC device forming part of the system shown in FIG. 1.

FIG. 2 is a block diagram illustrating the main components of the MTC device 2 shown in FIG. 1. As shown, the MTC device 2 has a transceiver circuit 31 that is operable to transmit signals to and to receive signals from a base station 5 via one or more antenna 33. The MTC device 2 has a controller 37 to control the operation of the mobile device 3. The controller 37 is associated with a memory 39 and is coupled to the transceiver circuit 31. Although not necessarily required for its operation, the MTC device 2 might of course have all the usual functionality of a conventional mobile telephone 3 (such as a user interface 35) and this may be provided by any one or any combination of hardware, software and firmware, as appropriate. Software may be pre-installed in the memory 39 and/or may be downloaded via the telecommunications network or from a removable data storage device (RMD), for example.

The controller 37 is configured to control overall operation of the MTC device 2 by, in this example, program instructions or software instructions stored within memory 39. As shown, these software instructions include, among other things, an operating system 41, a communications control module 43, an MTC configuration module 45, a signal quality determination module 46, a timer module 47, and a reporting module 49.

The communications control module 43 is operable to control the communication between the MTC device 2 and other communications devices, such as other MTC devices 2, mobile telephones 3, or the base station 5.

The MTC configuration module 45 is operable to configure the operation of the MTC device 2, e.g. based on control data received from the base station 5 (or another network element). In particular, the MTC configuration module 45 configures the appropriate values of the transmission delay timer and the signal quality threshold by taking into account control parameters stored in the memory 39 and/or obtained from the network.

The signal quality determination module 46 is operable to measure the cellular network signal levels and to determine whether signal quality is sufficient to send/receive data to other communication devices (e.g. the base station 5). Signal quality is determined to be sufficient when it meets or exceeds the signal quality threshold value configured by the MTC configuration module 45.

The timer module 47 is operable to configure and start the appropriate delay transmission timer when the MTC device 2 is scheduled or triggered to transmit data.

The reporting module 49 is operable to generate and send measurement and/or other data to a remote communication device in or connected to the core network 7 (another 'machine') or user equipment (e.g. a mobile telephone 3). The reporting module 49 is connected to the signal quality determination module 46 and the timer module 47 to determine when to send data.

<Base Station>

Figure 3:
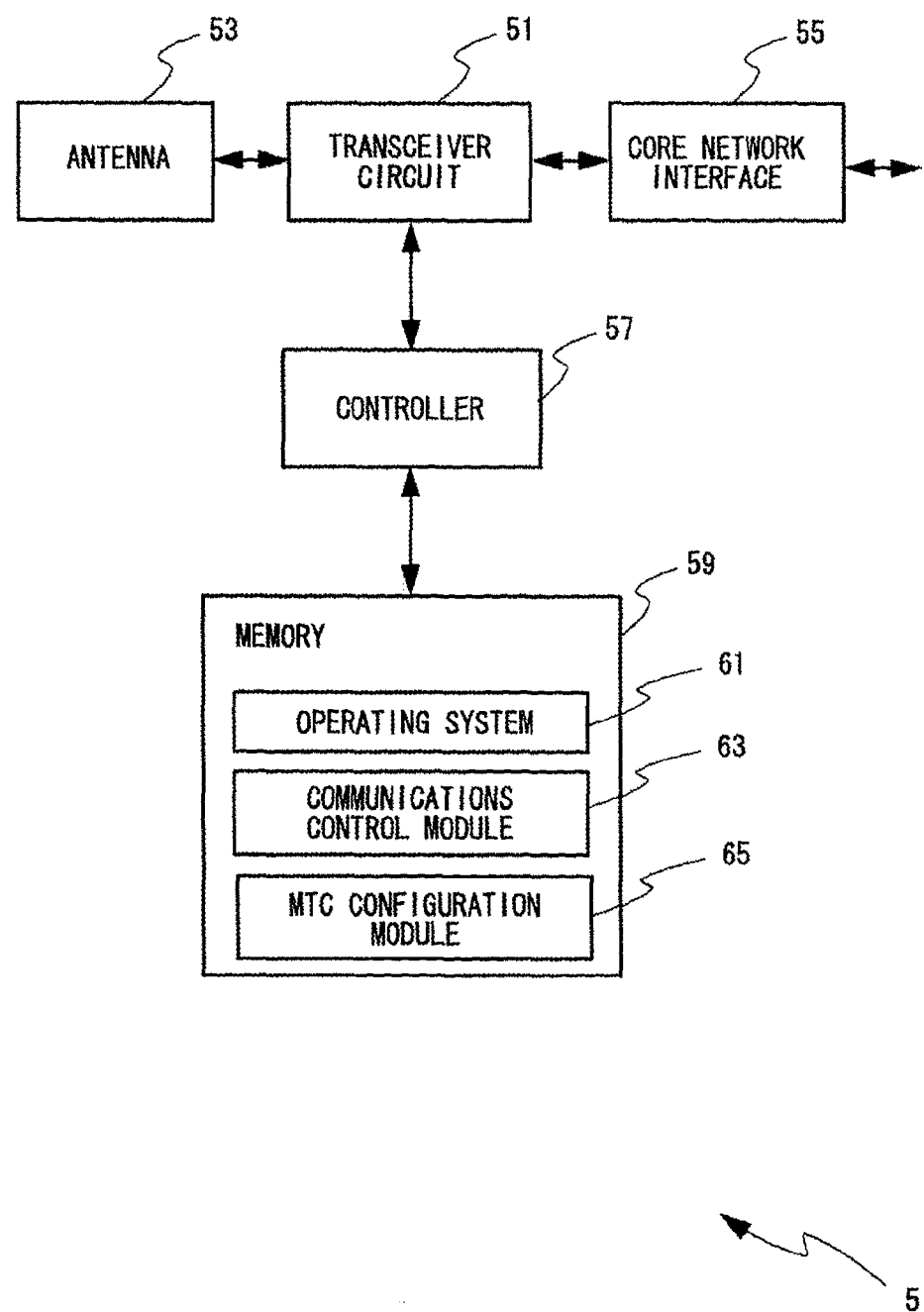
FIG. 3 is a block diagram of a base station forming part of the system shown in FIG. 1.

FIG. 3 is a block diagram illustrating the main components of the base station 5 shown in FIG. 1. As shown, the base station 5 has a transceiver circuit 51 for transmitting signals to and for receiving signals from the communications devices (such as MTC devices 2) via one or more antenna 53, a core network interface 55 for transmitting signals to and for receiving signals from the core network 7. The base station 5 has a controller 57 to control the operation of the base station 5. The controller 57 is associated with a memory 59. Although not necessarily shown in FIG. 3, the base station 5 will of course have all the usual functionality of a cellular telephone network base station and this may be provided by any one or any combination of hardware, software and firmware, as appropriate. Software may be pre-installed in the memory 59 and/or may be downloaded via the communications network 1 or from a removable data storage device (RMD), for example. The controller 57 is configured to control the overall operation of the base station 5 by, in this example, program instructions or software instructions stored within memory 59. As shown, these software instructions include, among other things, an operating system 61, a communications control module 63, and an MTC configuration module 65.

The communications control module 63 is operable to control the communication between the base station 5 and the MTC devices 2, the mobile telephones 3 and other network entities that are connected to the base station 5. The communications control module 63 also controls the separate flows of downlink user traffic and control data to be transmitted to the communications devices associated with this base station 5 including, for example, control data for managing operation of the MTC devices 2 and/or the mobile telephones 3.

The MTC configuration module 65 is operable to provide the appropriate values of the transmission delay timer and the signal quality threshold to the MTC device 2. The values can be provided to each MTC device 2 using a dedicated radio connection (e.g. if the values are specific to the MTC device 2) or can be broadcast (e.g. as part of system information) in which case the values may be applicable to all devices served by the cell(s) of the base station 5 or may be provided with information identifying a specific device or a group of devices to which the values apply. The MTC configuration module 65 might obtain (at least part of) these values from another network entity such as the MME 9 and/or the HSS 10.

In the above description, the MTC device 2 and the base station 5 are described for ease of understanding as having a number of discrete modules (such as the communications control modules and the MTC configuration modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

<Operation>

A more detailed description will now be given (with reference to FIGS. 4 to 6) of the scenario discussed above where an MTC device 2 optimises its battery consumption required for transmitting data to a remote server.

Figure 4:
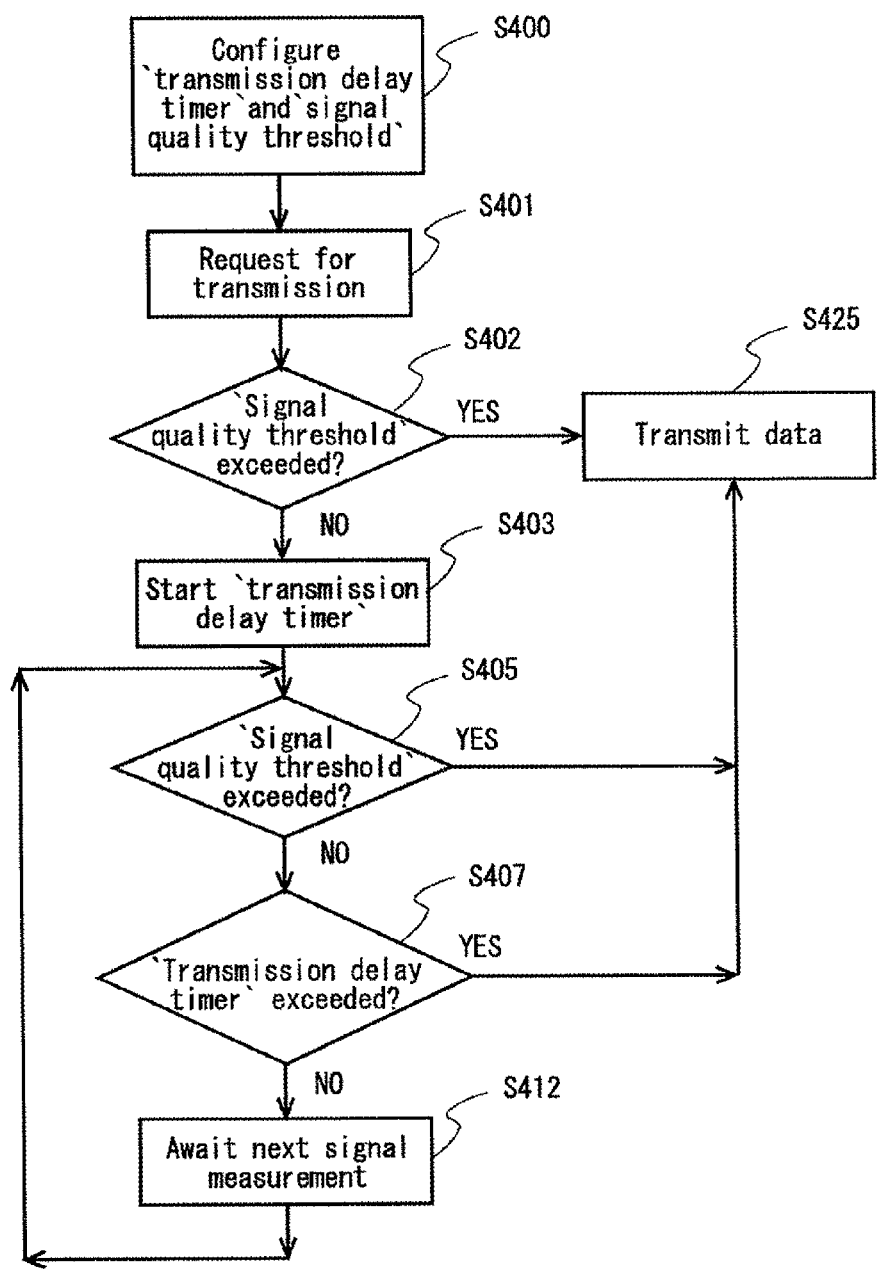
FIG. 4 is a flowchart illustrating an example process performed by the MTC device shown in FIG. 1 when determining whether signal conditions are favourable to transmit data.

FIG. 4 is a flowchart illustrating an example process performed by the MTC device 2 shown in FIG. 1 when determining whether signal conditions are favourable to transmit data.

Initially, as shown in step s400, the MTC configuration module 45 configures the values of the transmission delay timer and the signal quality threshold for the MTC device 2. The values might be retrieved from the memory 39 or obtained from the network either at start-up, location update, or cell reselection of the MTC device 2. The values might be specific to this MTC device 2 and/or might comprise values that are specific for the current cell and/or area that the MTC device is located in. Furthermore, in the absence of a network provided value, the MTC configuration module 45 might use a default value for either of the transmission delay timer and the signal quality threshold.

Next, in step s401, the reporting module 49 indicates that the MTC device 2 needs to communicate with the network (e.g. to send data, such as measurement results, synchronisation data, or the like). At this phase, the transceiver circuit 31 of the MTC device 2 is currently switched off or is operating in a low-power mode.

Therefore, before powering up the transceiver circuit 31, the signal quality determination module 46 checks whether or not the current signal conditions are favourable for establishing radio communication with the base station 5 without wasting battery power. Specifically, the signal quality determination module 46 compares the current value of the measured signal quality to the configured signal quality threshold. If the measured signal quality meets or exceeds the configured threshold, the MTC device 2 proceeds to step s425 and transmits data via base station 5.

If, however, the signal quality determination module 46 determines that the current signal conditions are not favourable (i.e. the measured signal quality is below the configured threshold), in step s403, it informs the timer module 47 to start the transmission delay timer and continues monitoring the signal quality.

In step s405, the signal quality determination module 46 checks again whether the signal quality has improved and now meets or exceeds the configured threshold. If the signal quality determination module 46 determines that the threshold is met or exceeded, the MTC device 2 proceeds to step s425 and transmits data via base station 5.

If, however, the signal quality determination module 46 determines that the current signal conditions are not favourable, the MTC device 2 proceeds to step s407, in which it checks whether or not the transmission delay timer has expired. If the transmission delay timer has expired, the MTC device 2 starts transmitting data (s425) without further delay.

When in step s412 the signal quality determination module 46 performs the next signal measurements, the MTC device 2 returns to step s405. Steps s405 to s412 are repeated until either expiry of the transmission delay timer or until the signal conditions meet/exceed the configured threshold. After step s425, i.e. after all data has been transmitted, the transceiver circuit 31 goes into a low-power mode, or is switched off completely.

The above process advantageously reduces battery consumption of the MTC device 2 and also reduces co-channel interference (due transmissions performed only when favourable signal conditions are detected—hence at relatively low power). This in turn might also increase the overall system capacity.

Figure 5:
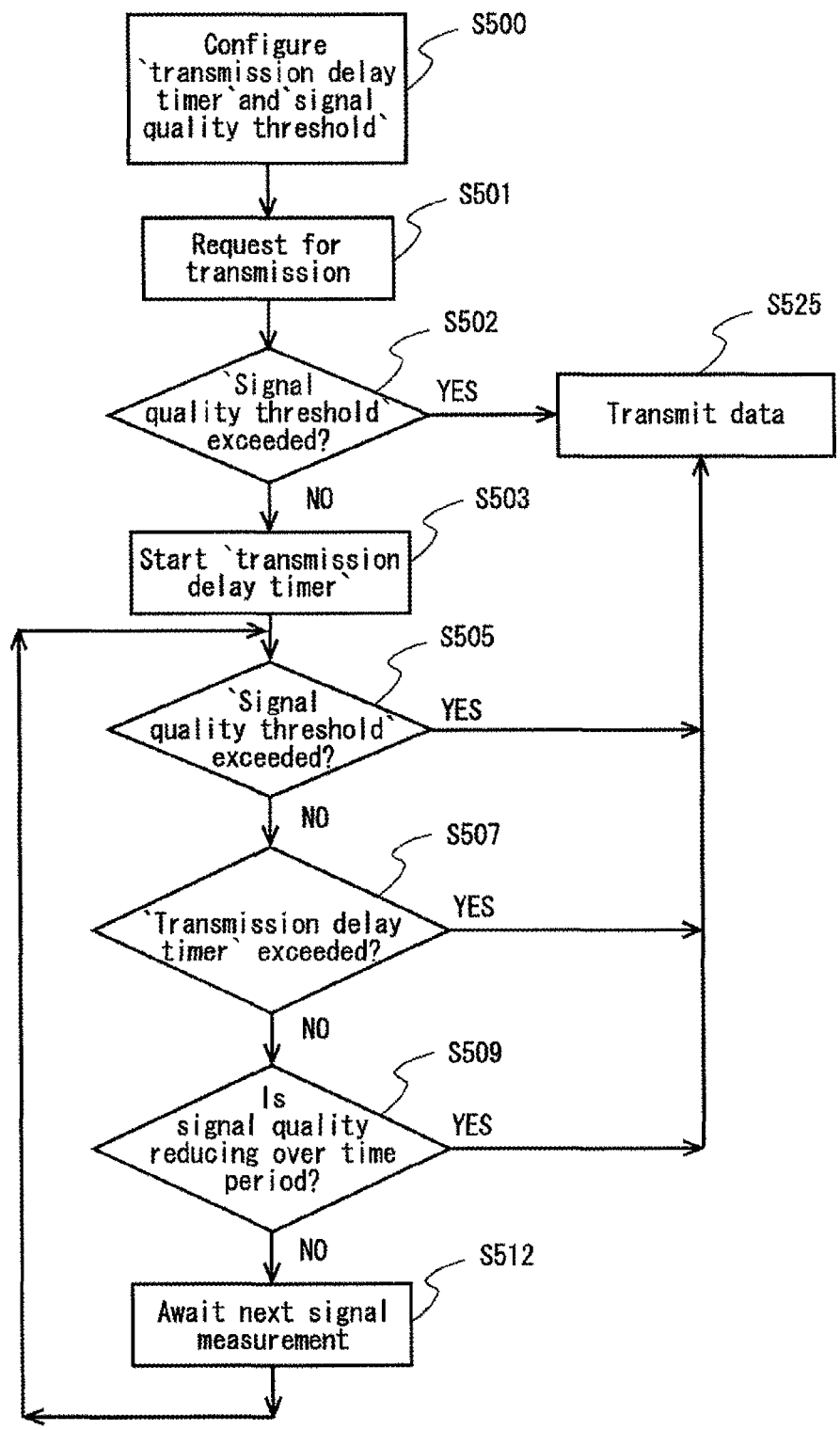
FIG. 5 is a flowchart illustrating another example process performed by the MTC device shown in FIG. 1 when determining whether signal conditions are favourable to transmit data, the process also taking into account deterioration of the signal quality.

FIG. 5 is a flowchart illustrating another example process performed by the MTC device 2 shown in FIG. 1 when determining whether signal conditions are favourable to transmit data, the process also taking into account deterioration of the signal quality.

Specifically, in this embodiment if the MTC device 2 determines that the signal quality is getting worse over time rather than improving whilst the transmission delay timer is running, then the MTC device 2 transmits the data immediately (i.e. as soon as signal quality deterioration is determined) in order to avoid any further worsening of the link attenuation and corresponding increase in transmit power.

Steps s500 to s507 correspond to steps s400 to s407 of FIG. 4, respectively. Step s525 corresponds to step s425.

However, in this example, if data transmission has still not started after step s505 or s507, the signal quality determination module 46 performs an additional check before waiting for the next measurement (at step s512) to see whether the current (unfavourable) signal conditions have actually become worse since the previous signal measurement(s).

Therefore, in step s509, the signal quality determination module 46 checks whether the signal quality is reducing over time (e.g. compared to the last measurement alone or to an average of a number of immediately preceding measurements). If the signal quality determination module 46 determines that signal conditions have become worse, the MTC device 2 proceeds to step s525 and starts transmitting data to the remote server whilst it is still able to communicate with the base station 5 (before the MTC device 2 moved even further away from it).

However, if the signal quality determination module 46 determines that the signal quality has not gotten worse compared to the previous measurement(s) (i.e. the measured signal quality has remained the same or improved but has not yet met the threshold), the MTC device 2 proceeds to step s512 and awaits the next signal measurement.

Steps s505 to s512 are repeated until any one of the conditions to transmit data are met. After step s525, i.e. after all data has been transmitted to the remote server, the transceiver circuit 31 goes into a low-power mode, or it is switched off completely.

This alternative advantageously prevents the MTC device 2 delaying transmissions too long in the event when the signal conditions experienced by the MTC device 2 are not improving whilst the transmission delay timer is running.

Figure 6:
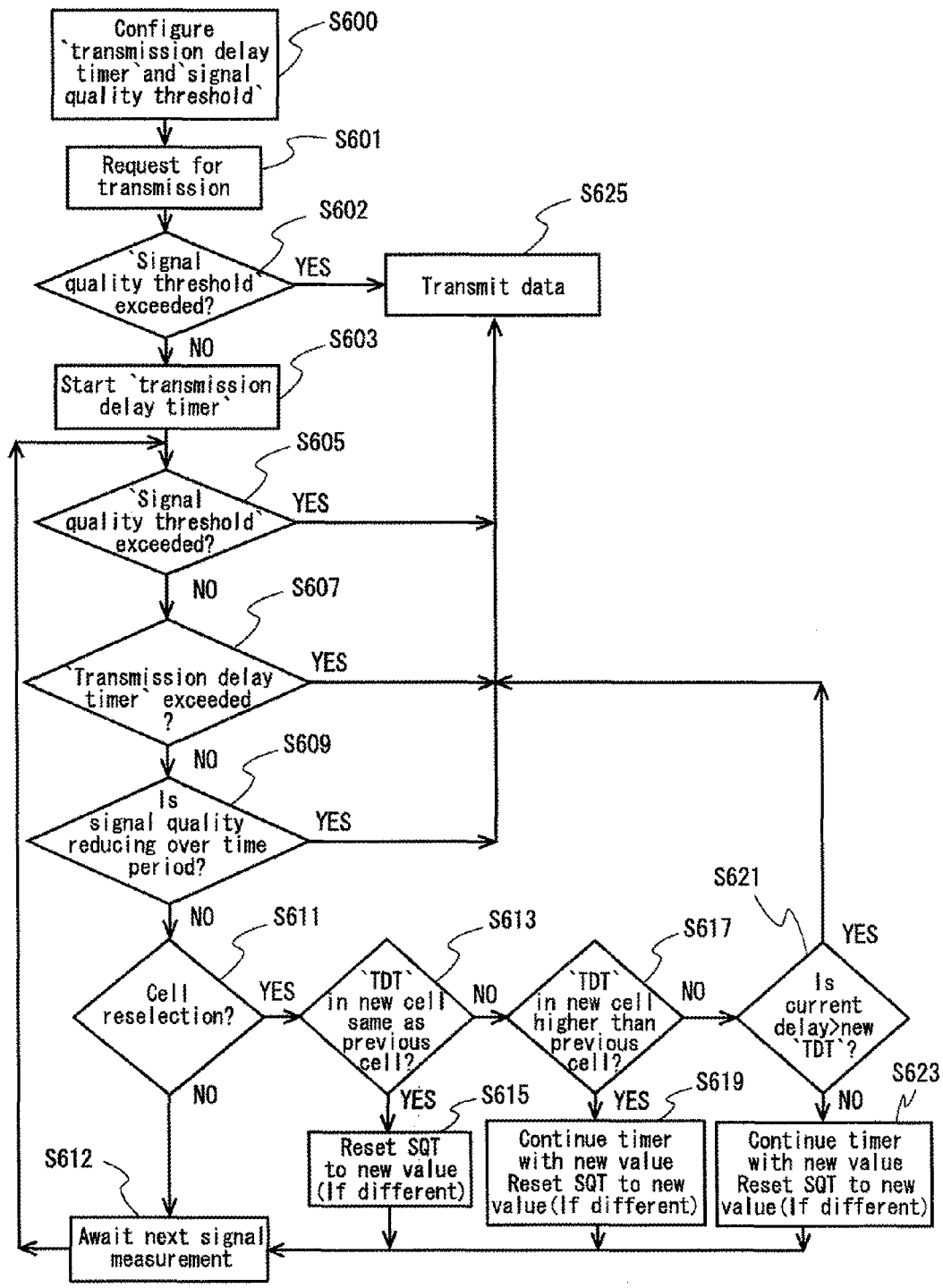
FIG. 6 is a flowchart illustrating an alternative of the previous example process performed by the MTC device shown in FIG. 1 when determining whether signal conditions are favourable to transmit data, the process also taking into account cell re-selection.

FIG. 6 is a flowchart illustrating an alternative of the previous example process performed by the MTC device 2 shown in FIG. 1 when determining whether signal conditions are favourable to transmit data, the process also taking into account cell re-selection.

As explained above, different cells (e.g. Cell 1 and Cell 2 shown in FIG. 1) might have different associated transmission delay timers and/or signal quality threshold values. Therefore, this example beneficially provides for situations in which the MTC device 2 performs a cell reselection whilst the transmission delay timer is still running and different values of timers/signal quality threshold are applicable in the new cell (or area that the new cell belongs to).

Steps s600 to s609 correspond to steps s500 to s509 of FIG. 5, respectively, and step s625 corresponds to step s425/s525.

In this example, however, if the conditions to transmit data are still not met in step s609, the MTC device 2 also determines, in step s611, whether a cell reselection has occurred since the previous signal measurement. This can be determined by, for example, the signal quality determination module 46 comparing the current cell identifier (which is obtained e.g. during the signal measurements) with the cell identifier for the immediately preceding signal measurement (which might be retrieved from memory 39).

If the signal quality determination module 46 determines that cell reselection has not been performed, the MTC device 2 proceeds to step s612 in which the MTC device 2 awaits performance of the next signal measurement before returning to step s605 (as described previously with reference to FIGS. 4 and 5).

However, if in step s611 the signal quality determination module 46 determines that a cell reselection has been performed since the last signal measurement (e.g. due to movement of the MTC device 2 or changes in signal propagation characteristics in the communications network 1, etc.), the MTC device 2 proceeds to step s613 to verify whether or not it should keep using the same transmission delay timer for the new cell.

If the MTC device 2 determines, in step s613, that the transmission delay timer for the new cell is the same as for the previous cell, it proceeds to step s615, in which the signal quality determination module 46 verifies whether the signal quality threshold value needs to be reset for the new cell (and modifies the signal quality threshold value accordingly, if necessary). The timer module 47 maintains the current (already running) transmission delay timer, and the MTC device 2 proceeds to step s612 in which it awaits performance of the next signal measurement before returning to step s605.

If, however, the MTC device 2 determines, in step s613, that the transmission delay time for the new cell is not the same as for the previous cell, it proceeds to step s617, in which it determines whether the transmission delay time for the new cell is higher than for the previous cell. If the MTC device 2 determines that the new transmission delay time is higher, it then proceeds to step s619, in which its timer module 47 continues the timer based on a new delay time value corresponding to that of the new cell (e.g. by increasing the remaining delay time based on the difference between the delay time values of the previous cell and new cell or by starting a new timer that is adjusted with any time elapsed since the start of the previous timer). In step s619, the signal quality determination module 46 also verifies whether the signal quality threshold value also needs to be reset for the new cell (and modifies the signal quality threshold value accordingly, if necessary). After this, the MTC device 2 proceeds to step s612 in which it awaits performance of the next signal measurement before returning to step s605.

If, in step s617, the MTC device 2 determines that the new transmission delay timer value is not higher than the current timer, it then proceeds to step s621, in which it also checks whether the delay measured by timer module 47 has already reached or exceeded the new transmission delay value associated with the new cell. If the new timer value has been reached or exceeded (i.e. the timer for the new cell would have expired), the MTC device 2 proceeds to step s625 and starts transmitting data to the remote server immediately.

If, in step s621, the timer module 47 indicates that the current delay has not reached the new transmission delay time (i.e. the timer for the new cell would not have expired), then the MTC device 2 proceeds to step s623, in which the timer module 47 applies the new transmission delay time value (e.g. by decreasing the remaining delay time based on the difference between the delay time values of the previous cell and new cells or by starting a new timer that is adjusted with any time elapsed since the start of the previous timer). In step s623, the signal quality determination module 46 also verifies whether the signal quality threshold value also needs to be reset for the new cell (and modifies the signal quality threshold value accordingly, if necessary). After this, the MTC device 2 proceeds to step s612 in which it awaits performance of the next signal measurement before returning to step s605.

Steps s605 to s623 are repeated until any one of the conditions to transmit data are met. After step s625, i.e. after all data has been transmitted to the remote server, the transceiver circuit 31 goes into a low-power mode, or it is switched off completely.

This alternative allows the MTC device 2 to update the transmission delay timer and the signal quality threshold values even after a cell reselection has been performed. This will advantageously prevent the MTC device 2 using incorrect values (e.g. short timer optimised for urban areas (small cells) when the MTC device 2 has already moved to a rural area having larger cells) and thus ensures that data transmissions occur at (or close to) an optimum power level for the given cell.

<Delivery and Usage of Parameters>

Figure 7A:
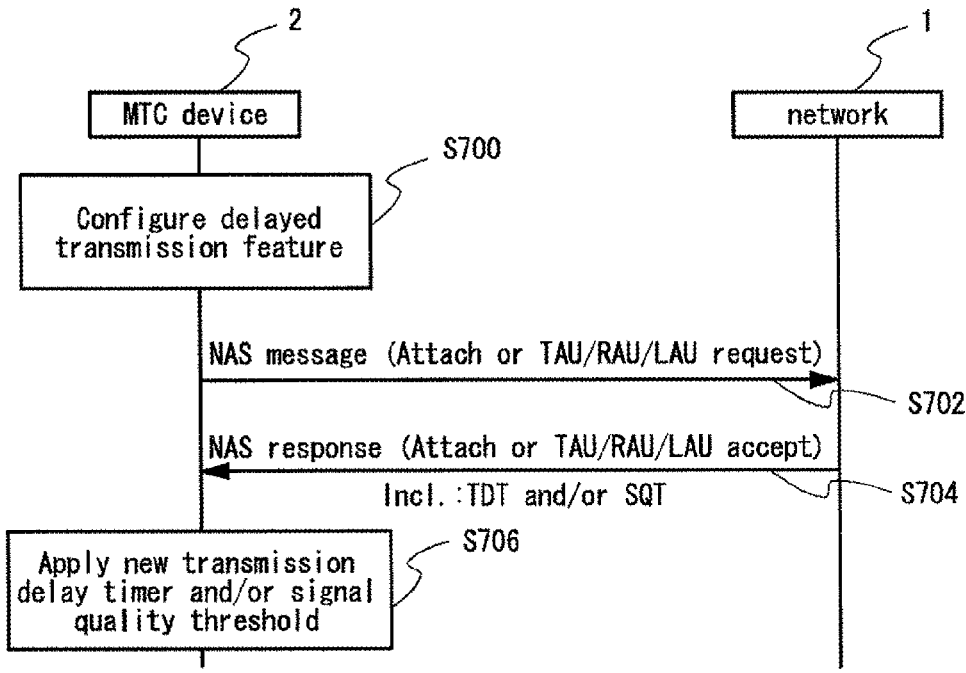
FIG. 7A is an example timing diagram illustrating the provision of transmission delay timer and/or signal quality threshold values using NAS signalling.
Figure 7B:
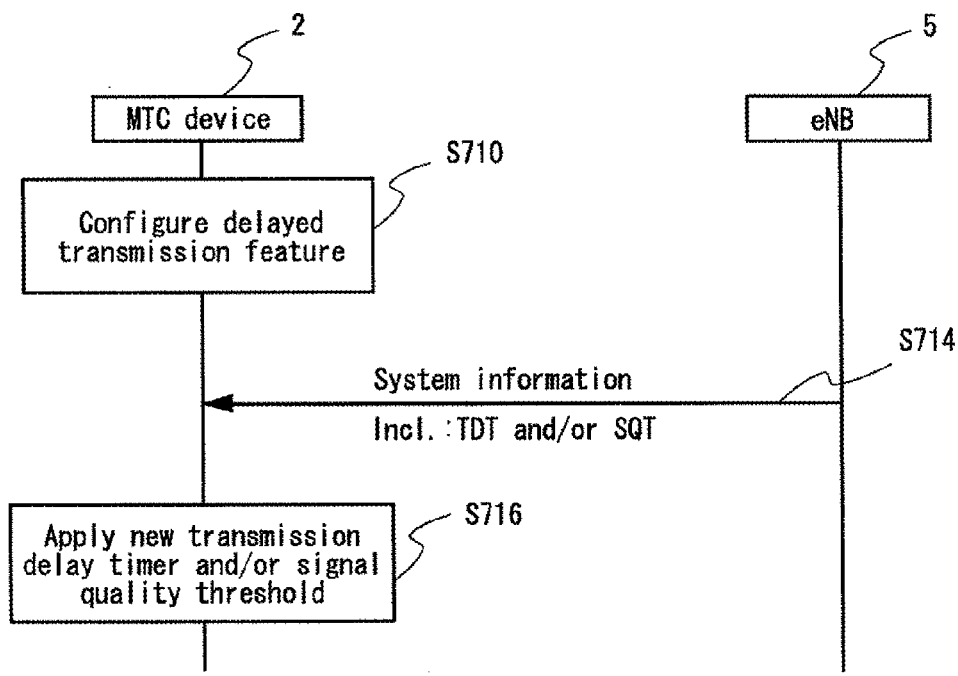
FIG. 7B is another example timing diagram illustrating the provision of transmission delay timer and/or signal quality threshold values using RRC signalling.

In general, the parameters of 'signal quality threshold' and 'transmission delay timer' might be provided to the MTC device 2 by either:

Non Access Stratum (NAS) signalling (FIG. 7A);
Radio Resource Control (RRC) signalling (FIG. 7B);
Open Mobile Alliance Device Management (OMA DM) signalling; and
Universal Subscriber Identity Module Over-the-Air (USIM OTA) signalling.

The MTC device 2 can be configured for 'transmission delay timer' and 'signal quality threshold' features use as per 3GPP TS 24.368 in case OMA DM is used, or as per 3GPP TS 31.102 when USIM OTA is used. The contents of these 3GPP specifications are included herein by reference.

FIG. 7A is an example timing diagram illustrating the provision of transmission delay timer and/or signal quality threshold values using NAS signalling.

In this example, as shown in step s700, the MTC device 2 is initially configured (either as a default factory configuration or as an application specific setting) to use the delayed transmission feature. At this phase, the MTC device 2 might use default values for either of the delay transmission timer and the signal quality threshold.

Next, in step s702, the MTC device 2 connects to a communications network 1 and therefore sends, to a corresponding NAS entity in the network, an appropriate Non Access Stratum message, e.g. at least one of an 'Attach request', a 'Tracking Area Update' request, a 'Routing Area Update Request', and a 'Location Area Update' request message. The NAS entity, for example, might be an MME (for LTE) or a Serving GPRS Support Node (for UTRAN) or the like.

The network responds, in step s704, by sending to the MTC device 2 an appropriate NAS message, i.e. at least one of an 'Attach accept', a 'Tracking Area Update accept', a 'Routing Area Update' accept, and a 'Location Area Update' accept message. The NAS response message also includes the currently used values of the delay transmission timer and/or the signal quality threshold.

In step s706, the MTC device 2 (via its timer module 47 and/or signal quality determination module 46) applies the received delay transmission timer and/or signal quality threshold values and uses them until a subsequent update is obtained (e.g. when the MTC device 2 performs a subsequent cell reselection).

FIG. 7B is another example timing diagram illustrating the provision of transmission delay timer and/or signal quality threshold values using RRC signalling.

In this example, as shown in step s710, the MTC device 2 is initially configured (either as a default factory configuration or as an application specific setting) to use the delayed transmission feature. At this phase, the MTC device 2 might use default values for either of the delay transmission timer and the signal quality threshold.

Next, in step s714, the MTC device obtains, from base station 5, the current values of the delay transmission timer and/or the signal quality threshold (e.g. for the cell(s) of this base station 5) using the RRC layer. Step s714 of this example comprises the MTC device 2 listening to system information broadcast by the RRC layer of the base station 5. However, other type of RRC layer signalling might be used, in particular, a request/response type of RRC signalling communication, similar to the NAS messages described with respect to FIG. 7A. In this case, the values of the delay transmission timer and/or the signal quality threshold might be included in an information element within the response message sent from the base station 5 to the MTC device 2.

Finally, in step s716, the MTC device 2 (via its timer module 47 and/or signal quality determination module 46) applies the obtained delay transmission timer and/or signal quality threshold values and uses them until a subsequent updated is obtained (e.g. when the MTC device 2 performs a subsequent cell reselection).

<Modifications and Alternatives>

Detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

Different applications, for example, have different grade of service requirements in terms of latency of communication with the network. The above alternatives are applicable to at least those applications that are delay tolerant and mobile. Example use cases include:

Tracking of cargo container location and other parameters such as temperature
Low priority reporting of routine vehicle maintenance data
Upload of data collected by sinks from sensor networks
Animal tracking
Media upload to cloud storage for backup or synchronisation with other devices
Meteorological data collection by mobile devices
Geo-blogging or photo-blogging In contrast, applications that are not delay tolerant (require low latency) might not use the above alternatives. In particular, applications for emergency use can be configured not to use this feature or to use a delay time of zero. Examples of applications requiring low latency include vehicle collision detection systems and payment systems for which delaying transmission until better coverage may not be beneficial.

The transmission delay timer and/or signal quality threshold based feature may be enabled by an author of an application running on the MTC device (e.g. an 'app' on mobile telephone) or by a service provider. The application author may request enablement of the feature (and/or specific timer/threshold values) through an application programming interface (API) call to a device platform or a network service platform on a remote server. The service provider may request enablement of the feature (and/or specific timer/threshold values) through a network service platform API for specific application types and/or terminal types.

If the MTC device supports the execution of multiple applications, then usage of the transmission delay timer and/or signal quality threshold feature may be configured either universally across all applications or individually for each application or group of applications.

The values of the transmission delay timer and/or the signal quality threshold may be different depending on the type of the service (e.g. a delay time of zero for emergency alerts and a longer delay time for non-critical data).

It will be appreciated that the MTC device might be configured to transmit any data as soon as its buffer memory becomes full regardless of the signal quality or whether the delay timer has expired.

The delay timer may be a countdown timer adapted to expire on reaching zero, or some other minimum value, or a count-up timer adapted to expire when a maximum value is reached.

It will be appreciated that where the delay time changes during cell reselection or at other times the currently running timer may not, itself, be modified to reflect this. For example, a new timer may be started to reflect the change in delay time and the old timer ignored for the purposes of determining when to send data. Or, where the modified delay time is longer than the previous delay time, a new timer may be started on expiry of the old timer and data only sent when both timers have expired to reflect the increase in delay time. Keeping the old timer (and possibly threshold values) may be particularly beneficial in the case of a device moving back and forth between two or more cells.

It will be appreciated that whilst embodiments of the invention have been described with particular reference to machine-type data transmissions (e.g. transmission of data acquired during measurement events and the like), the data sent may comprise any form of data depending on the application in which the communications device is being used. For example, the above embodiments may be applicable for transmitting other data such as user data, backup data, synchronisation data, diagnostic data, monitoring data, usage statistics, error data and/or the like.

In the above embodiments, the MTC device (operating in an E-UTRAN based system) measures RSRP and/or RSRQ and compares at least one of these signal quality parameters with a respective signal quality threshold. However, it will be appreciated that any other type of measurement indicative of radio signal quality may be performed. In this case, the signal quality threshold may be specified and used in a different manner.

The signal quality threshold may be controlled such that the network can manage the approximate distance from the base station at which the devices transmit in order to reduce co-channel interference onto adjacent cells and thereby provide increased system capacity. Practically the effective cell size may be calculated by reference to the radio planning coverage maps. Radio system planners may, for example, make a judgement on the effective cell size for devices operating under this scheme and trade-off the delay of transmission and likely terminal velocities.

It may be possible for the MTC device to apply an offset to a reference cell measurement. For example, if radio quality is measured in dBm (i.e. a power ratio expressed in decibels (dB) of the measured power referenced to one milliwatt) and the value of 'cell edge' is chosen to be between approximately −95 dBm (e.g. in case of macro cells) and approximately −80 dBm (e.g. in case of small cells), then the signal quality threshold value might be set around −50 to −60 dBm, i.e. around 20 dB to 30 dB higher that the cell edge planning figure.

In order to reduce congestion arising from multiple MTC devices that have similar or identical reporting triggers, reporting at the same time, the value of the transmission delay timer and/or the signal quality threshold can be different for each MTC device.

One variation is particularly useful for scenarios involving different cell sizes. The effective cell size(s) for a base station is a function of the operating parameters of the base station, such as radio power and frequency, as well as other radio planning parameters. By changing transmission power and/or applying directional antennas, a base station is able to adapt the size and shape of its cell(s). Urban areas, for example, have generally smaller physical cells than rural areas because of network planning for high population density and typically larger signal attenuation due to buildings and other man-made objects. Furthermore, in urban areas, there are more likely to be largely overlapping and/or stacked cells (macro-cell to femto-cell) compared to rural areas where cells belonging to the came network tend to have minimal overlap. Accordingly, due to the relatively small cell sizes in an urban area, the MTC device is likely to have a higher probability of going above the 'signal quality threshold' before the expiry of the 'transmission delay timer' if travelling at a constant speed compared to e.g. large cells found in rural areas. Therefore, the operator of the communications network may be able to set the transmission delay timer (and/or signal quality threshold) for the MTC device to take account of the different cell sizes in the network (e.g. having longer delays for larger cells and smaller delays for smaller cells).

The values of delay transmission timer and/or the signal quality threshold may therefore be specific to a particular PLMN, RA/LA/TA, RA list/LA list/TA list, a cell or a mobile/MTC terminal or class/type of terminal. Additionally, they may be provided as an absolute value or as relative values (e.g. offsets from a default value—such as a cell or network specific default). In the case of a cell resection occurring whilst the transmission delay timer is still running (e.g. as described with reference to FIG. 6) different behaviour may be followed depending on the transmission delay timer and signal quality threshold parameters applied by the MTC device 2:

(1) For values of delay time and/or quality threshold fixed for whole PLMN, specified per device or device category, and/or fixed in the device (e.g. by a device specific application) then no specific action needs to be taken for cell reselection as the values are the same in the new cell and the transmission delay timer can continue after cell reselection as normal.

(2) For values of delay time and/or quality threshold specified per cell, RA or LA as a fixed value then the procedure of FIG. 6 is particularly applicable.

(3) For values of delay time and/or quality threshold specified per cell, RA or LA as an offset then, at cell re-selection, the new cell might have a different parameter to the previous cell and so the timer and/or threshold value may need to be reconstituted based on a cell specific offset and/or cell specific default value. Once the timer value is reconstituted then the procedure of FIG. 6 is also applicable.

Nevertheless, specifying the value(s) per cell, routing area, location area or tracking area is particularly advantageous.

The embodiment described with reference FIG. 7A uses at least one of an 'Attach accept', a 'Tracking Area Update accept', a 'Routing Area Update' accept, and a 'Location Area Update' accept message to provide the values of the transmission delay timer and/or signal quality threshold for the MTC device. However, it will be appreciated that any other NAS message and/or signal (existing or new) may be used instead. For example, a dedicated "transmission delay timer" NAS message and/or a dedicated "signal quality threshold" NAS message might be used between the NAS entity and the MTC device.

In the above description, an MME and an SGSN were given as two example NAS entities. However, it will be appreciated that any other NAS-capable communications entities within (or coupled to) the core network may be used to communicate the values of the transmission delay timer and/or signal quality threshold to the MTC device. The NAS entity providing these values may be implemented as a standalone entity (e.g. a "transmission delay time server" and/or a "signal quality threshold server" entity) or may be implemented as part of any other network entity.

Smartphones (e.g. mobile telephones 3 in FIG. 1) that are capable of running multiple applications in parallel, might have applications that are delay tolerant and applications that are not delay tolerant (low latency applications). In this case, low latency applications ignore the transmission delay timer and signal quality threshold parameters (or sets the delay time to—or near to—zero), whereas delay tolerant applications take advantage of the 'delayed transmission until better coverage' functionality. The terminal, in this example, is provided with the capability to manage applications that use the feature of 'delayed transmission until better coverage" and those that do not. For example, browser and online games may need immediate network service because of the real time nature of the user interaction and may therefore not use the 'delayed transmission until better coverage'. On the other hand, cloud backup of mobile device media and mail synchronisation are delay tolerant applications and hence may use the 'delayed transmission until better coverage' feature.

As discuss above, therefore, a system implementing the 'delayed transmission until better coverage' feature may use multiple signal quality thresholds either for an individual mobile device or across the devices in the network, or at least a part of a network, e.g. in a cell or RA. In the case of multiple thresholds (or timer values) being used in a mobile terminal, then this may be used, for example, for different priorities of information. For the case of different thresholds (or timer values) for different devices in a system or part of the system then this may be used to provide different times in which a mobile device retries to transmit data and in so doing spread the transmissions across the set of mobile devices in time in order to spread network load.

Accordingly, one benefit of the embodiments described above may be to spread the network load more evenly for devices in which transmission events are triggered at the same/similar time thereby reducing congestion.

In the above embodiments, the MTC devices are automated measuring devices. It will be appreciated that the above embodiments might be implemented using other devices than automated equipment such as, for example, mobile telephones, personal digital assistants, laptop computers, web browsers, e-book readers, etc.

In the above embodiments, a 3GPP radio communications (radio access) technology is used. However, any other radio communications technology (i.e. WLAN, Wi-Fi, WiMAX, Bluetooth, etc.) can be used for managing transmissions of MTC devices in accordance with the above embodiments. The above embodiments are also applicable to 'non-mobile' or generally stationary user equipment.

<Examples of MTC Applications>

Some examples of machine type communication applications are listed in the following table (source: 3GPP TS 22.368, Annex B). This list is not exhaustive and is intended to be indicative of the scope of machine type communication applications.

| Service Area | MTC applications |
|---|---|
| Security | Surveillance systems |
| | Backup for landline |
| | Control of physical access (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote Maintenance/ Control | Sensors |
| | Lighting |
| | Pumps |
| | Valves |
| | Elevator control |
| | Vending machine control |
| | Vehicle diagnostics |
| Metering | Power |
| | Gas |
| | Water |
| | Heating |
| | Grid control |
| | Industrial metering |
| Consumer Devices | Digital photo frame |
| | Digital camera |
| | eBook |

In the above description, the MTC device and the base station are described for ease of understanding as having a number of discrete functional components or modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

In the above embodiments, a number of software modules were described. As those skilled in the art will appreciate, the software modules may be provided in compiled or un-compiled form and may be supplied to the MTC device, to the base station or to the mobile telephone as a signal over a computer network, or on a recording medium. Further, the functionality performed by part or all of this software may be performed using one or more dedicated hardware circuits. However, the use of software modules is preferred as it facilitates the updating of the MTC device (or the mobile telephone having an MTC application), the base station in order to update their functionalities.

Various other modifications will be apparent to those skilled in the art and will not be described in further detail here.

This application is based upon and claims the benefit of priority from UK Patent Application No. GB1216927.2, filed on Sep. 21, 2012, the disclosure of which is incorporated herein in its entirety by reference.

REFERENCE SIGNS LIST 1 telecommunications network
2 MTC device
3 mobile telephone
5 E-UTRAN base station
7 core network
8 gateway
9 mobility management entity
10 home subscriber server
31, 51 transceiver circuit
33, 53 antenna
35 user interface
37, 57 controller
39, 59 memory
41, 61 operating system
43, 63 communications control module
45, 65 MTC configuration module
46 signal quality determination module
49 timer module
49 reporting module
55 core network interface

The invention claimed is:

1. A communications device for communicating via a cell operated by a base station of a communications network, the communications device comprising:
an identifying unit that identifies that transmission of data to a communications node coupled to said communications network has been triggered;
a determining unit that determines an indication of radio quality in said cell and for determining whether said indication of radio quality meets a required radio quality criteria responsive to said transmission being triggered; and
a transmitting unit that transmits said data to the communications network, wherein said transmitting unit is operable to:
(a) transmit said data to said communications network after a delay if said determining unit has determined that said quality of radio signals does not meet said required radio quality criteria; and
(b) transmit said data to said communications network without said delay if said determining unit has determined that said quality of radio signals meets said required radio quality criteria.

2. The communications device according to claim 1 further comprising a monitoring unit that monitors, when said determining unit has determined that said quality of radio signals does not meet said required criteria, said indication of radio quality in said cell and for determining whether said indication of radio quality changes to meet said required radio quality criteria.

3. The communications device according to claim 2 wherein said transmitting unit is operable to transmit said data to the communications network after a predetermined maximum delay if said monitoring unit determines that said indication of radio quality has not changed to meet said required radio quality criteria.

4. The communications device according to claim 3 wherein said transmitting unit is operable to transmit said data to the communications network, before said predetermined maximum delay has expired, responsive to said monitoring unit determining that said indication of radio quality has changed to meet said required radio quality criteria.

5. The communications device according to claim 4 wherein said monitoring unit is operable to determine if a change in said indication of radio quality is indicative of a decrease in said radio quality and wherein said transmitting unit is operable to transmit said data to the communications network, before said predetermined maximum delay has expired, responsive to said monitoring unit determining that a change in said indication of radio quality is indicative of a decrease in said radio quality.

6. The communications device according to claim 4 wherein said predetermined maximum delay is set by an entity in the communications network, for example said base station.

7. The communications device according to claim 4 wherein said predetermined maximum delay is set dependent on an identity or type of at least one of: any data to be sent; an application generating the data; said communications device; said communications network; a base station; the cell in which the communications device is located; a routing area in which the communications device is located; a tracking area in which the communications device is located; and a location area in which the communications device is located; or a list comprising said identity or type.

8. The communications device according to claim 3 wherein said monitoring unit is operable to determine if a change in said indication of radio quality is indicative of a decrease in said radio quality and wherein said transmitting unit is operable to transmit said data to the communications network, before said predetermined maximum delay has expired, responsive to said monitoring unit determining that a change in said indication of radio quality is indicative of a decrease in said radio quality.

9. The communications device according to claim 8 wherein said predetermined maximum delay is set by an entity in the communications network, for example said base station.

10. The communications device according to claim 8 wherein said predetermined maximum delay is set dependent on an identity or type of at least one of: any data to be sent; an application generating the data; said communications device; said communications network; a base station; the cell in which the communications device is located; a routing area in which the communications device is located; a tracking area in which the communications device is located; and a location area in which the communications device is located; or a list comprising said identity or type.

11. The communications device according to claim 3 wherein said predetermined maximum delay is set by an entity in the communications network, for example said base station.

12. The communications device according to claim 3 wherein said predetermined maximum delay is set dependent on an identity or type of at least one of: any data to be sent; an application generating the data; said communications device; said communications network; a base station; the cell in which the communications device is located; a routing area in which the communications device is located; a tracking area in which the communications device is located; and a location area in which the communications device is located; or a list comprising said identity or type.

13. The communications device according to claim 3 further comprising an updating unit that updates said predetermined maximum delay in the event of a change of cell serving said communications device to a cell having a different predetermined maximum delay.

14. The communications device according to claim 1 wherein said communications device is configured to operate in a low-power mode, to enter a higher power mode in order to transmit any data, and to return to said low-power mode after any data has been transmitted.

15. The communications device according to claim 1 wherein said indicator of radio quality comprises a signal quality measurement result.

16. A base station of a communications network, the base station comprising:
    an operating unit that operates a cell for communication with a communications device according to claim 1;
    a providing unit that provides, to said communications device, information identifying a (or the) predetermined maximum delay and/or said radio quality criteria; and
    a receiving unit that receives, from said communications device, said data when transmitted by said communications device.

17. A system comprising the communications device according to claim 1 and a base station comprising:
    an operating unit that operates a cell for communication with the communication device;
    a providing unit that provides, to said communications device, information identifying a predetermined maximum delay and/or said radio quality criteria; and
    a receiving unit that receives, from said communications device, said data when transmitted by said communications device.

18. A method performed by a communications device for communicating via a cell operated by a base station of a communications network, the method comprising:
    identifying that transmission of data to a communications node coupled to said communications network has been triggered;
    determining an indication of radio quality in said cell and determining whether said indication of radio quality meets a required radio quality criteria responsive to said transmission being triggered; and
    transmitting said data to the communications network, wherein said transmitting step comprises:
    (a) transmitting said data to said communications network after a delay if said determining step has determined that said quality of radio signals does not meet said required radio quality criteria; and
    (b) transmitting said data to said communications network without said delay if said determining step has determined that said quality of radio signals meets said required radio quality criteria.

19. A method performed by a base station of a communications network, the method comprising:
    operating a cell for communication with a communications device according to claim 1;
    providing, to said communications device, information identifying a (or the) predetermined maximum delay and/or said radio quality criteria; and
    receiving, from said communications device, said data when transmitted by said communications device.

20. A non-transitory computer readable medium storing a computer program product comprising computer implementable instructions for causing a programmable computer device to become configured as the communications device of claim 1 or as a base station comprising:
    an operating unit that operates a cell for communication with the communication device;
    a providing unit that provides, to said communications device, information identifying a predetermined maximum delay and/or said radio quality criteria; and
    a receiving unit that receives, from said communications device, said data when transmitted by said communications device.

* * * * *